US010715529B2

(12) United States Patent
Szabo et al.

(10) Patent No.: US 10,715,529 B2
(45) Date of Patent: Jul. 14, 2020

(54) METHOD, APPARATUS, AND COMPUTER PROGRAM PRODUCT FOR PRIVACY MANAGEMENT

(71) Applicant: Conversant Wireless Licensing S.a r.l., Luxembourg (LU)

(72) Inventors: Udo Szabo, Helsinki (FI); Kristian Luoma, Kiviniemi (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

(21) Appl. No.: 14/970,100

(22) Filed: Dec. 15, 2015

(65) Prior Publication Data
US 2016/0105448 A1   Apr. 14, 2016

Related U.S. Application Data

(63) Continuation of application No. 12/164,169, filed on Jun. 30, 2008, now abandoned.

(51) Int. Cl.
| | | |
|---|---|---|
| *H04L 29/06* | (2006.01) | |
| *G06F 21/62* | (2013.01) | |
| *G06F 21/10* | (2013.01) | |
| *G06F 3/0484* | (2013.01) | |

(52) U.S. Cl.
CPC ........ *H04L 63/104* (2013.01); *G06F 3/04847* (2013.01); *G06F 21/10* (2013.01); *G06F 21/6245* (2013.01)

(58) Field of Classification Search
CPC ............................ H04L 63/104; G06F 3/04847
USPC ........................................... 726/2–10, 26–30
See application file for complete search history.

(56) References Cited

U.S. PATENT DOCUMENTS

| | | | | |
|---|---|---|---|---|
| 7,305,713 | B1* | 12/2007 | Crance | H04L 63/10 705/57 |
| 8,166,406 | B1* | 4/2012 | Goldfeder | G06F 21/6263 709/224 |
| 8,719,903 | B1* | 5/2014 | Kilday | G06F 21/62 726/4 |
| 9,251,519 | B1* | 2/2016 | Bharat | G06Q 30/02 |
| 2007/0239982 | A1† | 10/2007 | Aggarwal et al. | |
| 2008/0046976 | A1* | 2/2008 | Zuckerberg | H04L 63/102 726/4 |
| 2008/0127176 | A1* | 5/2008 | Lee | G06F 16/958 717/174 |
| 2008/0134294 | A1† | 6/2008 | Mattox et al. | |

(Continued)

OTHER PUBLICATIONS

Wei et al., "Improved Customers' Privacy Preference Policy," 2007 IEEE International Conference on Granular Computing (GRC 2007) Year: 2007 | Conference Paper | Publisher: IEEE.*

(Continued)

*Primary Examiner* — Roderick Tolentino
(74) *Attorney, Agent, or Firm* — Conversant Wireless Licensing (57) ABSTRACT

An apparatus for privacy management may include a processor. The processor may be configured to access one or more privacy options. In this regard, each privacy option may be configured to provide members of one or more groups access to content. The processor may also be configured to provide for selection of a privacy option in association with the content. Associated methods and computer program products may also be provided.

14 Claims, 7 Drawing Sheets

(56) References Cited

U.S. PATENT DOCUMENTS

| | | | |
|---|---|---|---|
| 2008/0208956 A1* | 8/2008 | Spiridellis | G06Q 30/06 709/203 |
| 2008/0222170 A1† | 9/2008 | Farnham et al. | |
| 2009/0094280 A1* | 4/2009 | Chen | G06F 16/29 |
| 2009/0228486 A1* | 9/2009 | Kuehr-McLaren | G06Q 10/10 |
| 2009/0328186 A1* | 12/2009 | Pollutro | G06F 21/31 726/13 |

OTHER PUBLICATIONS

Marchal et al., "Optimizing network resource sharing in grids," GLOBECOM '05. IEEE Global Telecommunications Conference, 2005. Year: 2005 | vol. 2 | Conference Paper | Publisher: IEEE.*

\* cited by examiner
† cited by third party

METHOD, APPARATUS, AND COMPUTER PROGRAM PRODUCT FOR PRIVACY MANAGEMENT

CROSS-REFERENCE TO RELATED APPLICATIONS

The present application is a continuation of application Ser. No. 12/164,169, filed Jun. 30, 2008. The disclosure of the above application is hereby incorporated herein in its entirety by reference.

TECHNICAL FIELD

Embodiments of the present invention relate generally to management of access to shared information and, more particularly, relate to an apparatus, method and a computer program product for privacy management of shared information.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. However, as the ease of information transfer increases, users continue to demand more and different types of data. Mobile devices, networks, personal computers, and other computing devices can now capture numerous types of information about users and their activities. Such information may include location information, phone call information (e.g., what contacts were called, duration of calls, what calls were received), status information (e.g., working, sleeping, watching a movie), media information (e.g., recent photographs taken, music played), etc. The availability of this information is desirable to users, not only with respect to information about themselves and their own activities, but also with respect to their friends and business contacts.

Various services (e.g., online services) for sharing content in this regard have been developed. These services often permit users of the services to view or otherwise interact with the content shared by other users of the service. However, since any user of the service may view any content shared by any other user, privacy concerns may develop. As a result of these privacy concerns, users of the services may be hesitant or even refuse to share content on the service for fear of disclosing personal or otherwise sensitive information. While some services may provide various privacy mechanisms, difficulty in using many of these mechanisms may also have an adverse effect on content sharing and as result users may again be hesitant or refuse to share content.

BRIEF SUMMARY

A method, apparatus, and computer program product are described that provide for privacy management. Exemplary embodiments of the present invention may provide for privacy management by controlling privacy of shared content on a group basis. In this regard, a group may be a user defined group (e.g., family, co-workers, contacts in a contact list, or the like), or a group defined by, for example, a social networking website. In some exemplary embodiments, a privacy level ordering of the privacy options may be defined based at least in part on the membership numbers of the groups associated with the privacy options. In this regard, groups with more members may be considered less private.

Exemplary embodiments of the present invention may access the defined privacy options and allow a user to select a privacy option with respect to some or all shared content. In this regard, in some exemplary embodiments, privacy options may be determined based at least in part on the membership of the groups. As such, in some exemplary embodiments, each privacy option may provide for the inclusion of an additional group. Upon selection of a privacy option, members of the groups associated with the privacy option may be granted access to the associated shared content.

Some exemplary embodiments of the present invention implement a slider tool for selecting a privacy option. In this regard, the slider tool may include a privacy line, where movement along the line indicates more or less privacy. Privacy options may be indicated on the line along with the groups that have been associated with a respective to the privacy option. The slider tool may include a movable slider which can be implemented to select a privacy option.

Accordingly, in one exemplary embodiment, a method for privacy management is described. The method may include accessing one or more privacy options. In this regard, each privacy option may be configured to provide members of one or more groups access to content. The method may also include providing for selection of a privacy option in association with the content.

In another exemplary embodiment, an apparatus for privacy management is described. The apparatus may include a processor that may be configured to define one or more privacy options. In this regard, each privacy option may be configured to provide members of one or more groups access to content. The processor may also be configured to provide for selection of a privacy option in association with the content.

In another exemplary embodiment, a computer program product for providing service invitations is described. The computer program product may include at least one computer-readable storage medium having computer-readable program code instructions stored therein. The computer-readable program code instructions may include first program code instructions, and second program code instructions. The first program code instructions may be configured to define one or more privacy options. In this regard, each privacy option may be configured to provide members of one or more groups access to content. The second program code instructions may be configured to provide for selection of a privacy option in association with the content.

In yet another exemplary embodiment, an apparatus for privacy management is described. The apparatus may include means for defining one or more privacy options. In this regard, each privacy option may be configured to provide members of one or more groups access to content. The apparatus may also include means for providing for selection of a privacy option in association with the content.

Some exemplary embodiments of the invention may provide a method, apparatus, and computer program product for employment, for example, in mobile communications environments. As a result, in some exemplary embodiments, information such as selections of privacy options or content associated with privacy options may be shared across mobile environments. Further, some embodiments of the present invention may provide for privacy management within an online service that allows for synchronization between various platforms that a user may employ to access and interact with the online service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Figure 1:
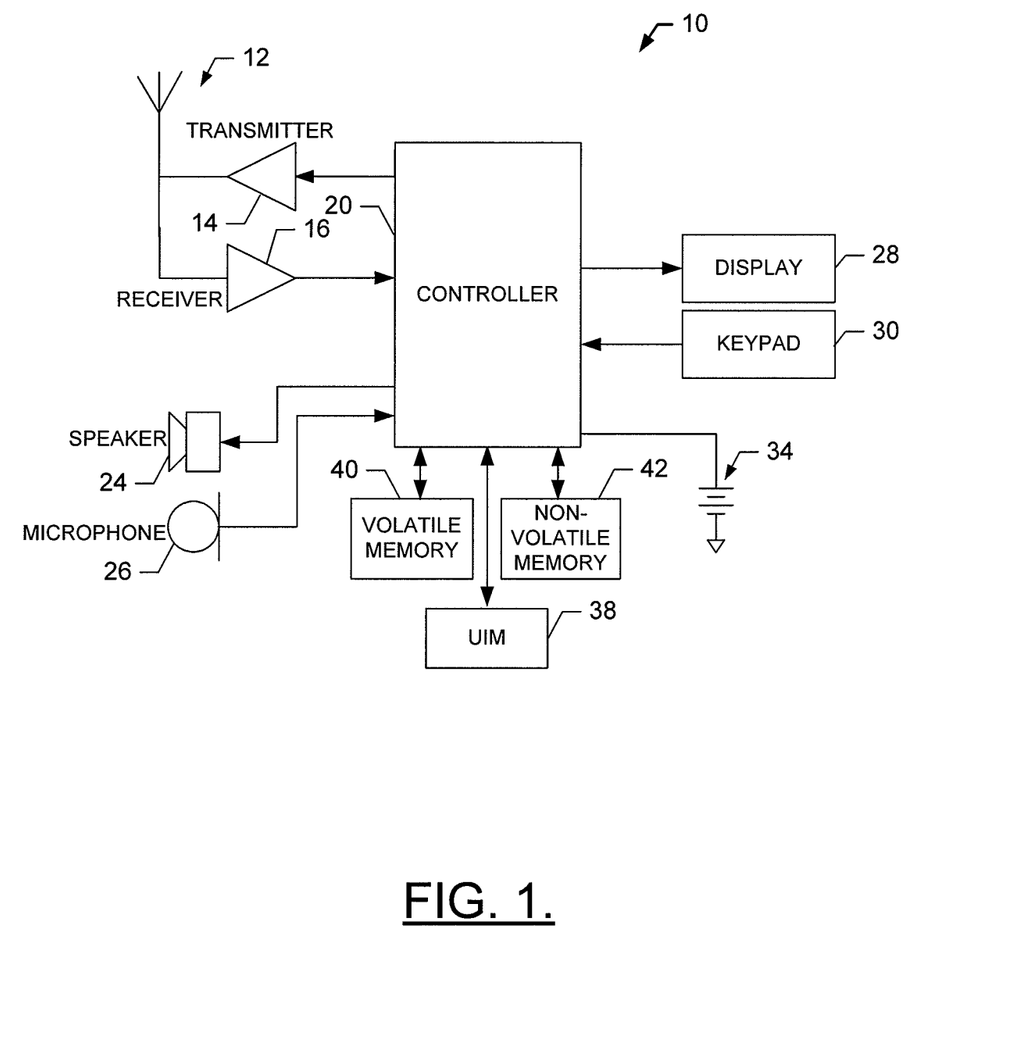
FIG. 1 is a schematic block diagram of a mobile terminal according to an exemplary embodiment of the present invention.

FIG. 1 illustrates a block diagram of a mobile terminal 10 that may implement and/or incorporate various aspects of exemplary embodiments of the present invention. In this regard, mobile terminal 10 may be a user platform that may be utilized to perform privacy management. It should be understood, however, that a mobile terminal embodied as a mobile telephone as illustrated and hereinafter described is merely illustrative of one type of mobile terminal that may implement exemplary embodiments of the present invention and, therefore, should not be taken to limit the scope of embodiments of the present invention. While several embodiments of the mobile terminal 10 are illustrated, and will be hereinafter described for purposes of example, other types of mobile terminals, such as portable digital assistants (PDAs), pagers, mobile televisions, gaming devices, mobile computers, laptop computers, cameras, video recorders, audio/video player, radio, global positioning system (GPS) devices, any combination of the aforementioned, and/or other types of voice and text communications systems, can readily employ embodiments of the present invention.

In addition, while several embodiments of the exemplary methods of the present invention may be performed or used by a mobile terminal 10, the exemplary methods may be employed by other than a mobile terminal (e.g., apparatus 200). Moreover, some of the apparatuses and methods of embodiments of the present invention will be described in conjunction with mobile communications applications. It should be understood, however, that the apparatuses and methods of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processor that provides signals to and receives signals from the transmitter 14 and receiver 16, respectively. The signals may include, or be representative of, signaling information in accordance with the air interface standard of the applicable cellular system, and also user speech, received data and/or user generated data. In this regard, the mobile terminal 10 may be capable of operating with one or more air interface standards, communication protocols, modulation types, and/or access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9 generation (3.9G) wireless communication protocols, such as Evolved Universal Terrestrial Radio Access Network (E-UTRAN), with fourth-generation (4G) wireless communication protocols, Long Term Evolution (LTE) protocols, or the like.

As an alternative (or additionally), the mobile terminal 10 may be capable of operating in accordance with non-cellular communication mechanisms. For example, the mobile terminal 10 may be capable of communication in a wireless local area network (WLAN), or other communication networks. Further, the mobile terminal 10 may communicate in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

It is understood that the apparatus, such as the controller 20, may include circuitry desirable for implementing audio and logic functions of the mobile terminal 10. For example, the controller 20 may be comprised of a digital signal processor device, a microprocessor device, various analog to digital converters, digital to analog converters, and/or other support circuits. Control and signal processing functions of the mobile terminal 10 may be allocated between these devices according to their respective capabilities. Thus, the controller 20 may also include the functionality to encode and interleave messages and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a web browser. The connectivity program may then allow the mobile terminal 10 to transmit and receive web content, such as content including web page content, according to a Wireless Application Protocol (WAP), Hypertext Transfer Protocol (HTTP) and/or the like, for example.

The mobile terminal 10 may also comprise a user interface that may include an output device such as a earphone or speaker 24, a microphone 26, a display 28, and/or a user input interface, all of which may be coupled to the controller 20. The user input interface, which may allow the mobile terminal 10 to receive data, may include any of a number of devices for allowing the mobile terminal 10 to receive data, such as a keypad 30, a touch display (not shown) or other input device. In embodiments including the keypad 30, the keypad 30 may include the numeric (0-9) and related keys (#, *), and/or other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a rechargeable battery and/or a vibrating battery pack, for powering various circuits that are required to operate the mobile terminal 10, as well as, optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber.

In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories can store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which may determine an identity of the current cell, e.g., cell id identity or cell id information, with which the mobile terminal 10 is in communication.

Figure 2:
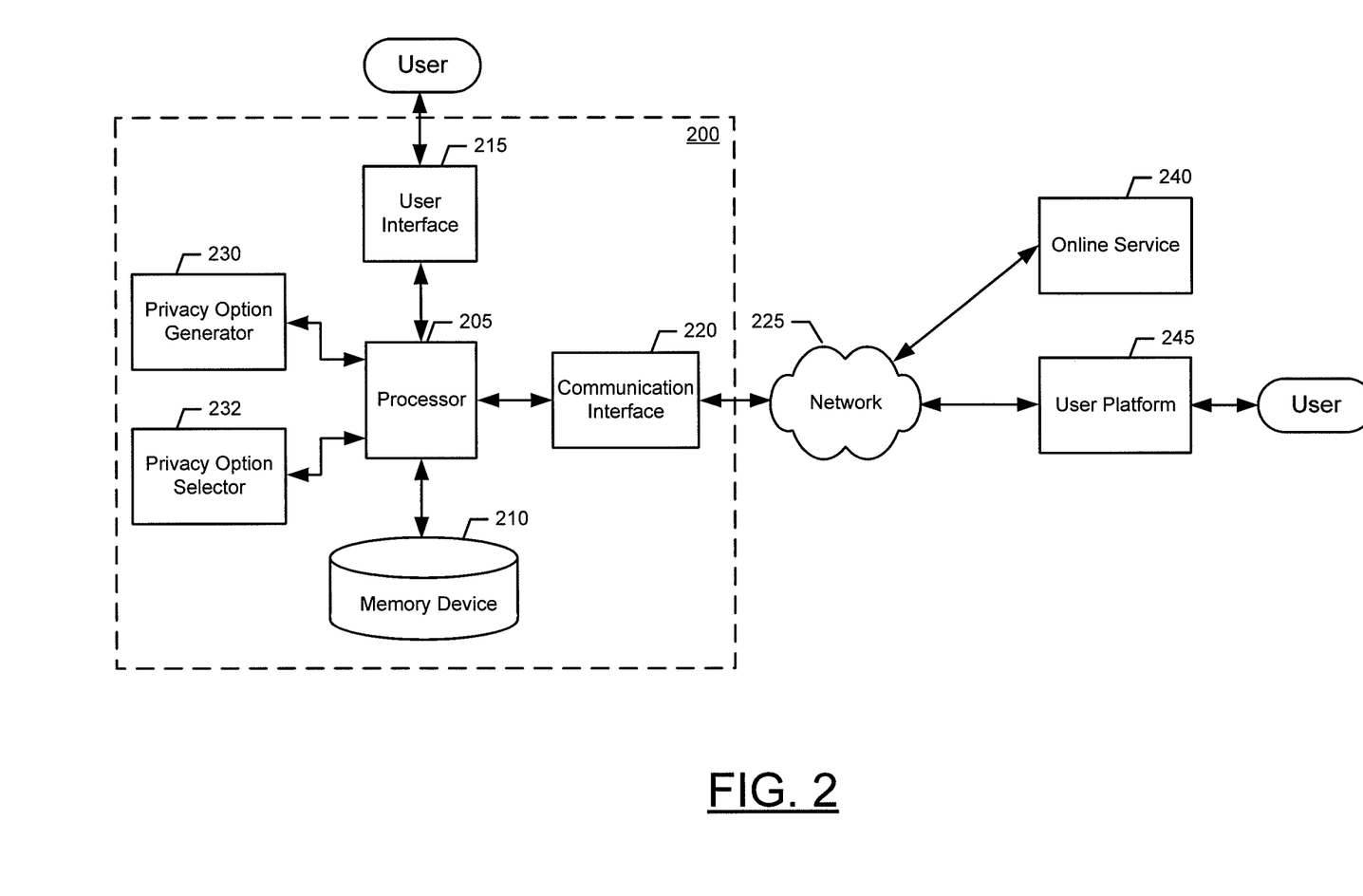
FIG. 2 illustrates a block diagram showing an apparatus for privacy management with associated network connectivity according to an exemplary embodiment of the present invention.

Referring now to FIG. 2, another exemplary apparatus 200 that may employ privacy management is described. Apparatus 200 may be embodied as a server or other network device including, for example, a mobile terminal, such as mobile terminal 10 of FIG. 1, another user platform, such as a computer, or the like. In some exemplary embodiments, apparatus 200 may be embodied as a server of an online service. In embodiments where the apparatus 200 is embodied as a server of an online service, the apparatus 200, and the processor 205, may be configured to perform the functions associated with an online service as described herein, such as the online service 240 or the service 300.

The apparatus 200 may include or otherwise be in communication with a processor 205, a user interface 215, a communication interface 220, and a memory device 210. The memory device 210 may include, for example, volatile and/or non-volatile memory (e.g., volatile memory 40 and/or non-volatile memory 42). The memory device 210 may be configured to store information, data, applications, instructions, or the like for enabling the apparatus to carry out various functions in accordance with exemplary embodiments of the present invention. For example, the memory device 210 could be configured to buffer input data for processing by the processor 205. Additionally, or alternatively, the memory device 210 could be configured to store instructions for execution by the processor 205. As yet another alternative, the memory device 210 may be one of a plurality of databases that store information in the form of static and/or dynamic information, for example, in association with privacy options, selections of privacy options, membership lists for groups, or the like.

The processor 205 may be embodied in a number of different ways. For example, the processor 205 may be embodied as various means including a microprocessor, a coprocessor, a controller (e.g., controller 20 from FIG. 1), or various other processing devices including integrated circuits such as, for example, an ASIC (application specific integrated circuit), FPGA (field programmable gate array), or a hardware accelerator. In an exemplary embodiment, the processor 205 may be configured to execute instructions stored in the memory device 210 or otherwise accessible to the processor 205.

The user interface 215 may be in communication with the processor 205 to receive an indication of a user input at the user interface 215 and/or to provide an audible, visual, mechanical, or other output to the user. As such, the user interface 215 may include, for example, a keyboard, a mouse, a joystick, a display, such as a touch screen display, a microphone, a speaker, and/or other input/output mechanisms. In an exemplary embodiment in which the apparatus 200 is embodied as a server, the user interface 215 may be limited, or even eliminated.

The communication interface 220 may be embodied as any device or means embodied in either hardware, software, or a combination of hardware and software that is configured to receive and/or transmit data from/to a network and/or any other device or module in communication with the apparatus 200. In this regard, the communication interface 220 may include, for example, an antenna, a transmitter, a receiver, a transceiver and/or supporting hardware or software for enabling communications with network 225, which may be any type of wired or wireless network. Via the communication interface 220 and the network 225, the apparatus 200 may communicate with the online service 240 and/or the user platform 245.

The online service 240 may be any type of computing device for storing, retrieving, computing, transmitting, and receiving data. The online service 240 may be embodied as a web server, file server, or the like, and may include a memory device, a processor, and a communication interface for communicating with the network 225. According to various embodiments, the online service 240 may operate as a website that may allow users of the website to share content. In some exemplary embodiments, the online service may receive selections of privacy options from, for example, apparatus 200 or user platform 245, and provide for privacy management.

The user platform 245 may also be any type of device for storing, retrieving, computing, transmitting, and receiving data. In some exemplary embodiments, user platform 245 may be embodied as a mobile terminal 10 of FIG. 1, a computer, other communications device or the like. In some exemplary embodiments, user platform 245 may be merely representative of a plurality of user platforms, and as such any number of user platforms may be connected to network 225. In some embodiments, via the user platform 245, a user may access an exemplary online service, such as the online service 240, or an online service hosted by the apparatus 200, using a browser, a dedicated application, or the like.

The privacy option generator 230 and privacy option selector 232 of apparatus 200 may be any means or device embodied in hardware, software, or a combination of hardware and software, such as processor 205 operating under software control, that is configured to carry out the functions of privacy option generator 230 and privacy option selector 232, respectively, as described herein. In an exemplary embodiment, the processor 205 may include, or otherwise control the privacy option generator 230 and/or privacy option selector 232. In various exemplary embodiments, the privacy option generator 230 and/or privacy option selector 232 may reside on differing devices such that the functionality of the privacy option generator 230 or privacy option selector 232, or subsets of the functionality of the privacy option generator 230 or privacy option selector 232, may be performed by a first device (e.g., an online service, a mobile terminal, or the like), and privacy option generator 230 or privacy option selector 232, or subsets of the functionality of the privacy option generator 230 or privacy option selector 232, may be performed by a second device (e.g., a mobile terminal, an online service, or the like).

In some embodiments, the system of FIG. 2 may be utilized for synchronization and/or sharing of content amongst the various network platforms. In this regard, the network platforms (e.g., the apparatus 200, the user platform 245, the online service 240, etc.) may be utilized by a user to access content made available via the network 225. In some exemplary embodiments, the network entities may be used to access content associated with an online service account associated with, for example, the online service 240 and/or the apparatus 200.

Any type of content may be synchronized and/or shared amongst the platforms and made available for access. Types of content that may be synchronized and/or shared may include, but should not be limited to, privacy options, selections of privacy options, membership lists and contact/identification information of the members of various groups, status information, content, user profile information, files (e.g., documents, photos, media content, etc.), contact information, or the like. For example, privacy option selections may be accessed and/or synchronized via the user platform 245, the online service 240, or the apparatus 200. Upon selecting and updating a privacy option or otherwise modifying content, the new and/or modified content may be transmitted to a data storage device (e.g., the apparatus 200 or the online service 240) or otherwise made available to the various network platforms for subsequent access and/or further modification.

In this manner, content modified on one network platform may be available to another network platform. For example, the modified content may be automatically transmitted from the user platform 245 to the online service 240 or the apparatus 200 for synchronization purposes. As such, a user may modify content on a first platform, (e.g., a mobile terminal), and then subsequently access the modified content on a second platform, (e.g., a browser or dedicated application on a computer). Moreover, the user may modify content and/or later access the modified content via, for example, user platform 245.

In some embodiments, a user may set synchronization parameters, which may identify types of content that should be synchronized and types of content that need not be synchronized. For example, a user may set the synchronization parameters to synchronize the selections of privacy options, but may also set the synchronization parameters such that a user profile information need not be synchronized.

Figure 3:
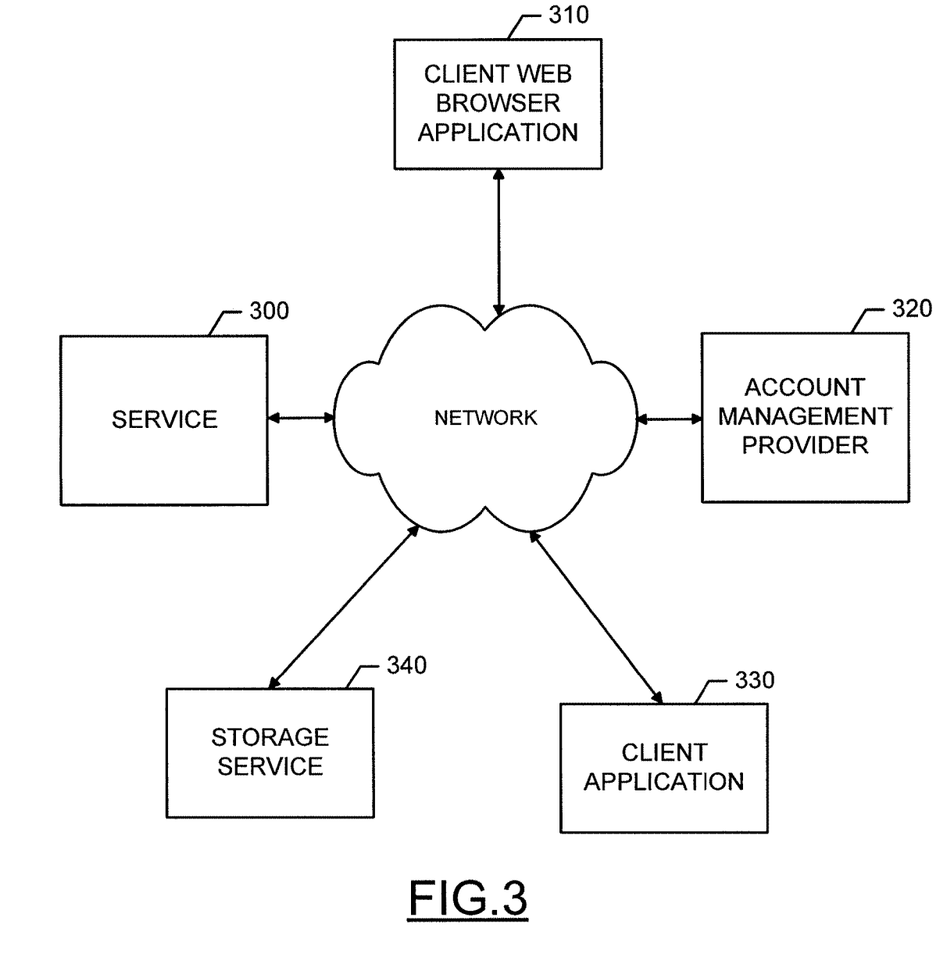
FIG. 3 illustrates an exemplary system of network entities for sharing various information including selections of privacy options according to exemplary embodiments of the present invention.

In this regard, and referring now to FIG. 3, an embodiment of a system in accordance with aspects of the present invention is illustrated. The system of FIG. 3 may include a service 300, a client web browser application 310, an account management provider 320, a client application 330, and a storage service 340. The service 300, the client web browser application 310, the account management provider 320, the client application 330, and the storage service 340 may be interconnected via the illustrated network, which may operate in the same manner as network 225.

The service 300, the account management provider 320, and the storage service 340 may collectively represent an exemplary embodiment of the apparatus 200 of FIG. 2. In this regard, the service 300 may employ an internet or network service (e.g., a website, a social networking website, a blog website, a web feed, a widget, or the like) that may receive and interact with privacy options and selections of privacy options, other content, and/or the like in a manner described with respect to the privacy option generator 230, privacy option selector 232, and/or processor 205. Various types of content, such as, but not limited to, selections of privacy options, may be synchronized with and/or otherwise transferred to and from, the service 300. The service 300 may utilize the storage service 340 for storage and retrieval of content by the service 300. In various embodiments, the service 300 and/or storage service 340 may operate in the same manner as apparatus 200 and the memory device 210 of apparatus 200 and/or the online service 240.

Further, the account management provider 320 may operate together with the various other network entities to perform account management and security features. In some embodiments, login information and passwords are first directed to the account management provider 320 for verification. Upon verification, the account management provider 320 may provide access to, and allow communications between, various network entities using, for example, a token or other access key.

Client application 330 may be a software or hardware application residing and operating on a platform, such as a computer, mobile terminal, or the like, that may be used to interact with the service 300. In some embodiments, the client application 330 may reside and operate on a platform, such as the apparatus 200, the user platform 245, or the like. The client application may be downloaded to and/or installed on the platform. In some embodiments, the client application 330 may be specifically tailored to interact with the service 300, that is, client application 330 may be a dedicated application. Via the client application 330, the platform, and the user of the platform, may interact with the service 300 to send, receive, and/or modify, as well as synchronize, content, such as selections of privacy options, between the client application 330 and the service 300. The client application 330 may facilitate the gathering and storage of content for subsequent transmission to the service 300.

Similar to the client application 330, the client web browser application 310 may be a software or hardware application residing and operating on a platform, such as a computer, mobile terminal, or the like, that may be used to interact with the service 300. In this regard, the client web browser application 310 may be a generic network communication application for interacting with various network entities, including the service 300. In some embodiments, the client web browser application 310 may reside and operate on the apparatus 200, the user platform 245, or the like. Via the client web browser application 310, a platform, and the user of the platform, may interact with the service 300 to send, receive, and/or modify, as well as synchronize, data, such as selections of privacy options, between the client web browser application 310 and the service 300. The client web browser application 310 may facilitate the gathering and storage of selections of privacy options and other data for subsequent transmission to the service 300.

Referring back to FIG. 2 and apparatus 200, the functionality and configuration of the apparatus 200 will be described in further detail with respect to various exemplary embodiments of the present invention. In this regard, the privacy option generator 230 of apparatus 200 may be configured to define one or more privacy options. Each privacy option may be associated with providing members of one or more groups associated with a respective privacy option access to content. Further, associations between the members of the one or more groups may be accessible via an online service.

The groups associated with a privacy option may be any collection of contacts, users, or members. In some exemplary embodiments, a group may be defined by a user. In this regard, the user may use a contacts list or other collection of entities and designate the members of a group. For example, a user may browse through a contacts list and define a family group, a co-workers group, a neighborhood group, or the like. The groups may be defined on, for example, user platform 245, and transferred to apparatus 200 and privacy option generator 203 for subsequent utilization in defining privacy options.

Further, groups for use in defining privacy options may be taken from existing groups defined with respect to the user on various online services, such as social networking websites. Friends and/or other relationship groups may be defined on a website, such as a social networking website. As such, the privacy option generator 230 may be configured to receive and utilize these groups when defining a privacy option. Where groups are taken from social networking websites and the like, a user may provide a login and/or password for the those sites, and the privacy option generator 230 may be configured to retrieve the group information from those sites and, in some exemplary embodiments, store the group information on, for example, memory device 210. For example, such groups may be retrieved from online service 240.

Further in this regard, groups may be associated with a particular user. As such, different users of an online service implementing privacy management according to various embodiments of the present invention may have differing groups, differing group types, and differing numbers of members of various groups. Accordingly, privacy options may be specifically defined with respect to an individual user or user account, rather than utilizing generic privacy options that are applied to all users.

In some exemplary embodiments, the size of the various groups may be utilized to define the privacy options. In this regard, in some exemplary embodiments, each privacy option may have a privacy level relative to the other privacy options. The relative privacy level may be based at least in part upon the number of members of the one or more groups associated with the privacy option. For example, a first privacy option may be associated with a family group that includes five members, while a second privacy option may be associated with the family group and a social networking group that has one hundred members. As a result, the first privacy option may be considered to have more privacy (due to being associated with less group members) and as such a relative privacy level may indicate that the first privacy option offers more privacy than the second privacy option.

In some exemplary embodiments, the privacy option generator 230 may be configured to define each relatively less private privacy option by associating the next defined privacy option with all of the groups associated with the previously defined privacy options plus the group with next greatest number of members. In this regard, consider the exemplary privacy option definition scenario of FIG. 4. The exemplary scenario includes three groups in the collection of available groups 400. The groups comprise a family group 410 having five members, a friends group 420 having twenty members, and an online social networking group 430 having 100 members. These groups may be used to define three privacy options, namely, the first privacy option 440, the second privacy option 450, and the third privacy option 460.

Figure 4:
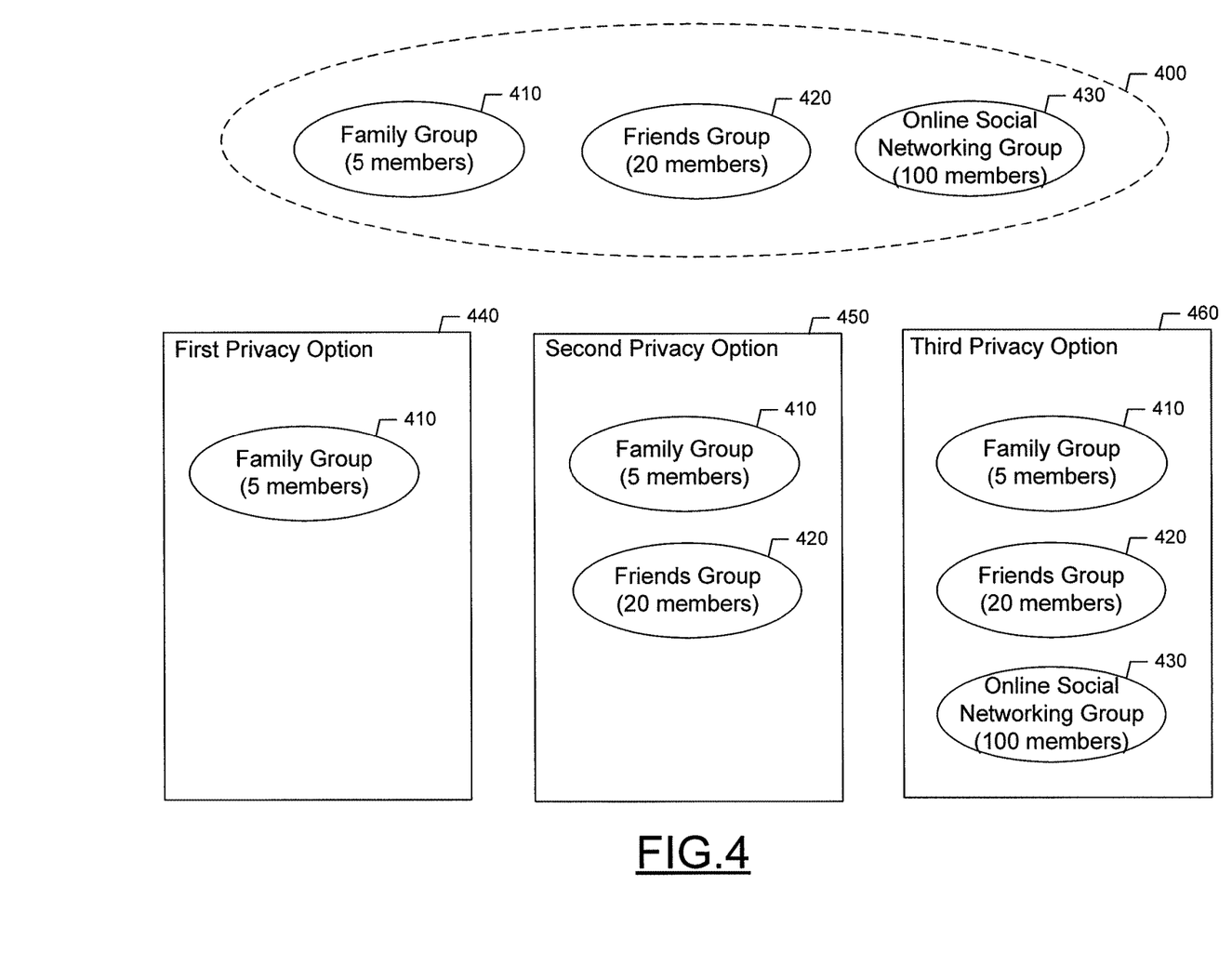
FIG. 4 illustrates an exemplary scenario for defining privacy options according to exemplary embodiments of the present invention.

In this regard, according to various exemplary embodiments, the first privacy option may be defined by identifying the group having the least number of members and associating that group with the first privacy option. As such, the family group 410, having five members, may be associated with the first privacy option 440. Then, to define the second privacy option 450, all the groups associated with the previously defined privacy options can be associated with the second privacy option 450. As such, family group 410 may be associated with the second privacy option 450. Then, a group having the next highest number of members can be identified and associated with the second privacy option 450. As such, the friends group 420, having twenty members can be identified and associated with the second privacy option 450. Subsequently, the third privacy option 460 may be defined by first associating the third privacy option 460 with all the groups associated with the previously defined privacy options. Accordingly, the family group 410 and the friends group 420 may be associated with the third privacy option 460. Additionally, a group having the next highest number of members can be identified and associated with the third privacy option 460. As such, the online social networking group 430 may be associated with the third privacy option.

While the description with respect to FIG. 4 describes one manner of defining group associations with privacy options, other manners or methods are contemplated which may be implemented to achieve the same or similar results. Accordingly, with respect to the results, in some exemplary embodiments, the privacy option generator 230 may be configured to define each privacy option such that no two privacy options are associated with all of the same groups. Further, each privacy option may be associated with a group having a largest group size for that privacy option. Further, in consideration of the number of members in the largest sized group associated with a given privacy option, all other available groups having less than the number of members in the respective largest sized group may be associated with the given privacy option.

Additionally, the privacy option generator 230 of apparatus 200 may be configured to order the privacy options. In this regard, the order of a privacy option in the ordering of privacy options may be indicative of a relative privacy level of the privacy option with respect to the other privacy options. Further, in some exemplary embodiments, the privacy option generator 230 may be configured to order the privacy options based at least in part on the number of members in the one or more groups associated with the privacy options.

The privacy option selector 232 may be configured to access one or more privacy options. In this regard, each privacy option may be configured to provide members of one or more groups access to content. Further, the privacy option selector may be configured to access defined privacy options as describe above. Further, in some exemplary embodiments, the privacy option selector 232 may be configured to access privacy options that have been previously defined and/or ordered, as described above.

The privacy option selector 232 of apparatus 200 may be configured to provide for selection of a privacy option. In some exemplary embodiments, a privacy option may be selected in association with content. In this regard, the content may be objects such as media files (e.g., images, videos, audio content, etc,), collections of content (e.g., albums, channels, etc.), personally defined landmark and routing information, current location information, or the like. Content may also include applications that may be used to interact with various data, such applications may include map and location applications (e.g., applications that may indicate the current or past location of a user), music player applications, media sharing applications, and the like. Accordingly, a selection of a privacy option may be associated with a single content item (e.g., one image or one application), groups of content items, (e.g., all images or select images), sub-items associated with a content item (e.g., aspects of an application), or a privacy option selection may be a global selection that may be associated with all content of a user. Additionally or alternatively, content may include associated with or otherwise related to a service such that the selection of a privacy option may be associated with a service such that the privacy option is applied to all content associated with or otherwise related to the service.

Further, the privacy option selector 232 may be configured to provide for the presentation of representations of the privacy options. The representations of the privacy options may be presented to facilitate selection of a privacy option. Further, the representations of the privacy options may be presented in a user interface of a settings page, or the representations of the privacy options may be presented with the presentation of the associated content item. Presenting the representations of the privacy options together with the associated the content item, wherever the content item appears, may facilitate efficient modification of a selection of a privacy option.

Additionally, the representations of the privacy options may be presented on a privacy line. In this regard, the arrangement of the representations of the privacy options along the privacy line may be based at least in part on the ordering of the one or more privacy options. Further, in some exemplary embodiments, privacy option selector 232 may be configured to provide for selection of the privacy option by allowing for the movement of a slider relative to the privacy line to a desired representation of a privacy option.

Figure 5:
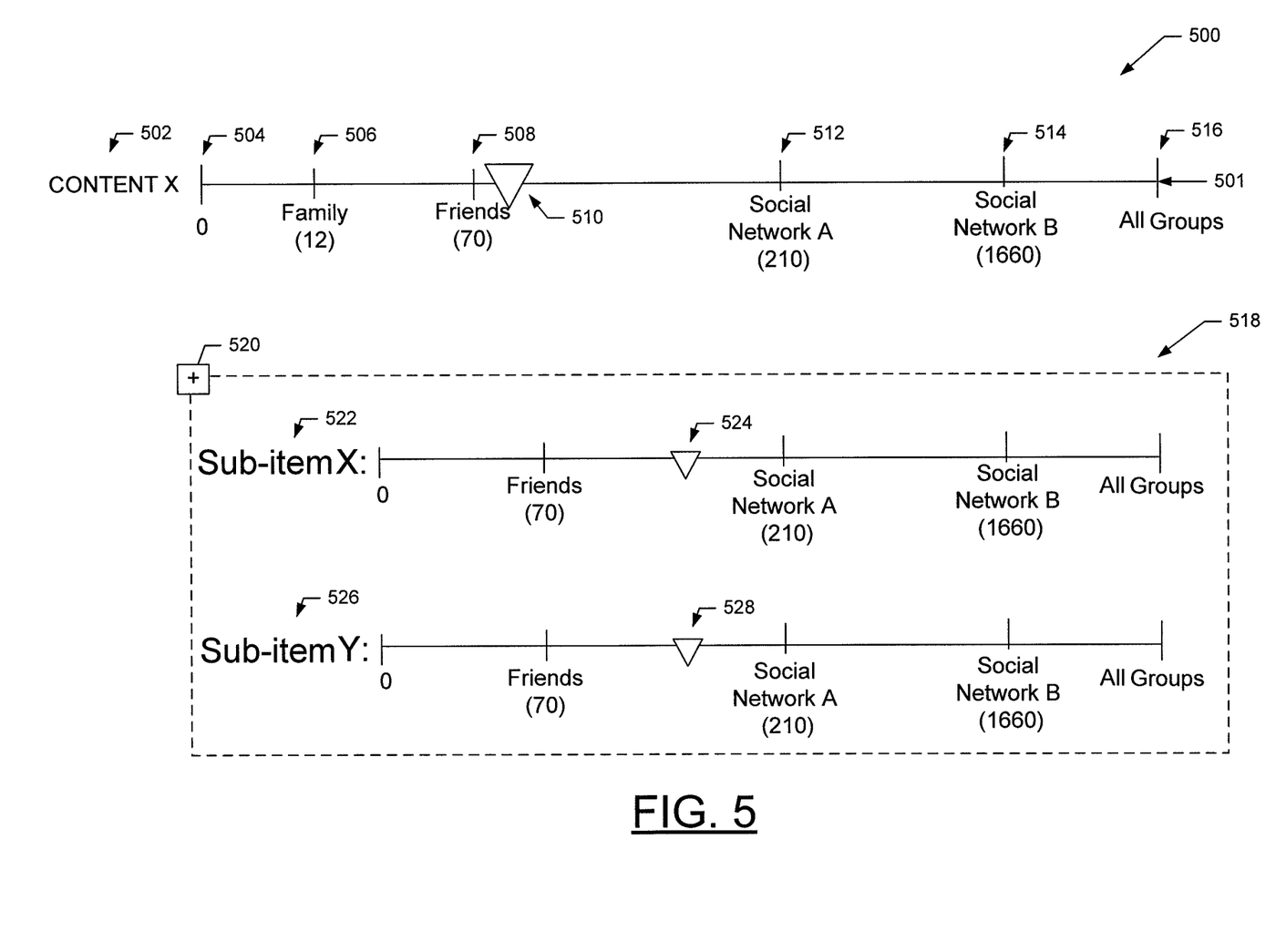
FIG. 5 illustrates an exemplary user interface including a slider tool for privacy management according to exemplary embodiments of the present invention.

In this regard, FIG. 5 illustrates an exemplary user interface including a slider tool for privacy management according to various exemplary embodiments of the present invention. The exemplary user interface of FIG. 5 may be implemented by user interface 215, and, further, a selection of a privacy option may be received by the user interface 215 and/or the processor 205. With respect to the exemplary user interface of FIG. 5, a slider tool 500 is provided. The slider tool 500 is configured to facilitate the selection of a privacy option with respect to an example content item. Accordingly, the slider tool 500 includes a label 502 describing the target content, namely, content X. Further, the slider tool 500 may include a privacy line 501 where movement along the privacy line 501 from left to right indicates a lesser privacy level for privacy options. Accordingly, the privacy options may be defined, and possibly ordered, as described above, and presented on the privacy line 501.

The defined privacy options included in slider tool 500 are depicted by privacy option representations. The privacy option representations may include an absolute privacy option representation 504, a family privacy option representation 506, a social network A privacy option representation 512, a social network B privacy option representation 514, and an all groups privacy option representation 516. Each privacy option representation may also include a presentation of the number of group members associated with an underlying privacy group. In some exemplary embodiments, the number of total members of all groups associated with the privacy option may be presented. In other embodiments, the incremental number of group members over the lower ordered privacy option may be presented. Further, a privacy option representation may be presented on the privacy line 501 to scale, or relatively to scale, based at least in part on the number of group members associated with the underlying privacy option. As such, family privacy option representation 506 may be presented closer to the friends privacy option representation 508 (due to a 58 member difference), than the friends privacy option representation 508 is to the social network A privacy option representation 210 (due to 140 member difference).

Further, selection of the absolute privacy option representation 504 may provide maximum privacy since no other users may be permitted to access content X. Accordingly, selection of the all groups privacy option representation 516 may make content X public, or may allow members of all groups to have access to context X providing the lowest level of privacy. Selection of the family privacy option representation 506, friends privacy option representation 508, social network A privacy option representation 512, or social network B privacy option representation 514 may provide relatively intermediate levels of privacy.

According to various exemplary embodiments, slider 510 may be moved to a desired privacy option representation to select the representation and the underlying privacy option.

Slider 510 may be moved using, for example, arrow or other movement keys of a keypad, by clicking with a mouse and dragging the slider 510 to a desired location, or the like.

The user interface of FIG. 5 also includes a sub-item privacy management container 518. In some exemplary embodiments the sub-item privacy management container 518 may be accessible by operating the expand/collapse button 520. With respect to the sub-item privacy management container 518, content X may include various aspects that may allow for privacy management at a sub-item level. As such, sub-item privacy management container 518 may include labels 522, 526 for the sub-items, namely, sub-item X and sub-item Y, respectively. Further, selections of privacy options with respect to the sub-items may also be provided for by privacy option selector 232. In this regard, sliders 524 and 528 may be utilized similar to slider 510 to select a privacy option and/or a representation of a privacy option.

Although exemplary privacy options are depicted in the embodiments of FIG. 5, other privacy options may be utilized in addition to or instead of those illustrated. For example, the privacy options presented along the privacy line may be various access networks, such as BT, WLAN, local area network (LAN), home network (e.g., WLAN or LAN), GSM, UMTS, etc. Since each access network is configured to communicate with potentially different groups, the selection of a particular access network correspondingly selects a privacy option by permitting sharing with members of the selected access network without necessarily permitting sharing with members of unselected larger access networks. By way of example, the selection of the BT privacy option may restrict the sharing to a relatively small group that is nearby, while the selection of the GSM privacy option or the privacy option associated with a corporate LAN may permit sharing with a much larger group.

Referring again to apparatus 200 of FIG. 2, the processor 205 may be configured to share the content in response to a request for content by a member of the one or more groups associated with the selected privacy option. Such sharing may occur within an online service such as the online service 240, the service 300, or a service implemented by the apparatus 200. In this regard, a user that is a member of a group associated with a selected privacy option may request access to content associated with privacy option via, for example, user platform 245. Since the user is a member of a group associated with a selected privacy option, the user may have access to the content.

Figure 6:
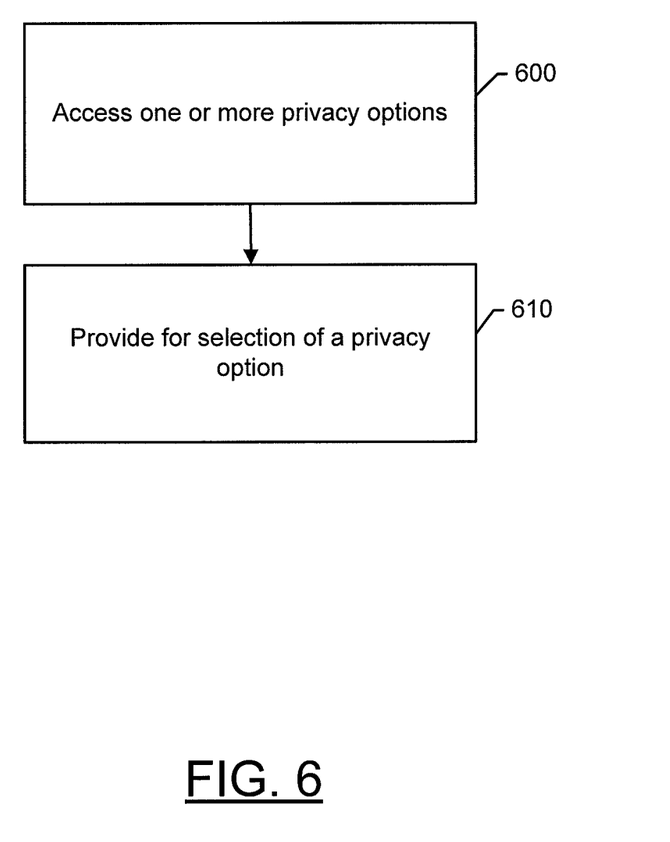
FIGS. 6 and 7 are flowcharts according to exemplary methods for privacy management according to exemplary embodiments of the present invention.
Figure 7:
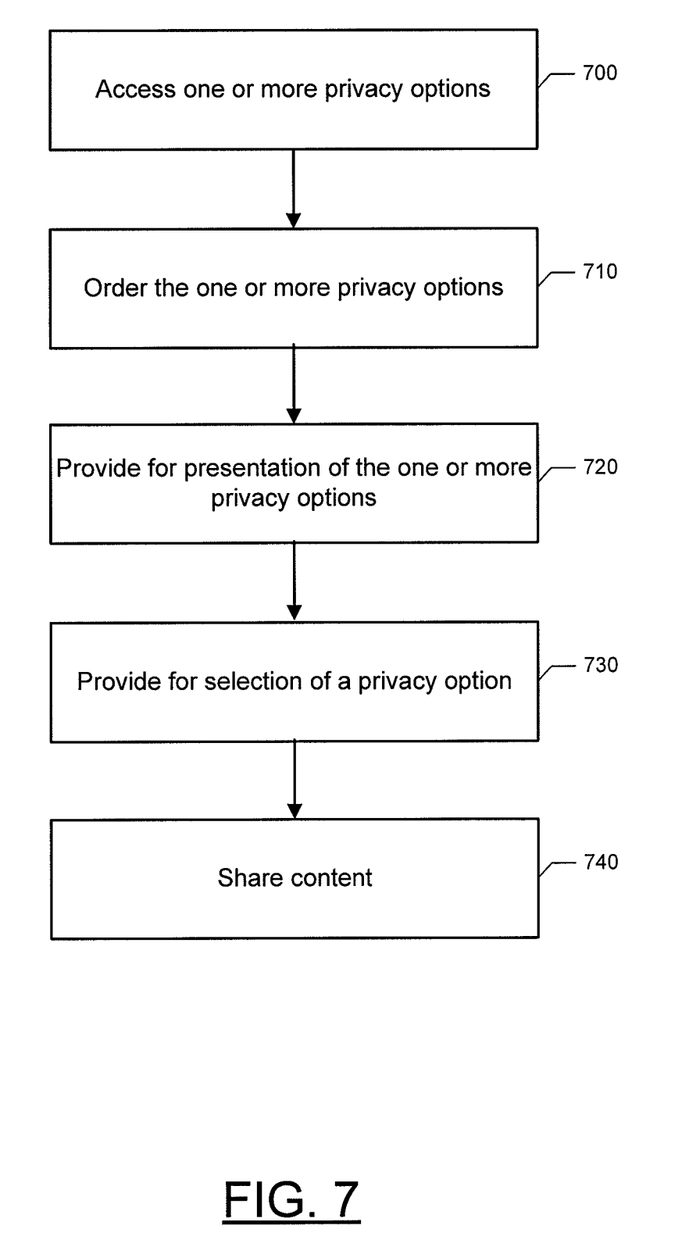

FIGS. 6 and 7 are flowcharts of a system, method, and program product according to exemplary embodiments of the invention. It will be understood that each block, step, or operation of the flowcharts, and combinations of blocks, steps or operations in the flowcharts, can be implemented by various means, such as hardware, firmware, and/or software including one or more computer program code instructions, program instructions, or executable program code instructions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (e.g., hardware such as processor 205 or controller 20) to produce a machine, such that the instructions which execute on the computer or other programmable apparatus create means for implementing the functions specified in the flowcharts block (s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowcharts block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowcharts block(s), step(s), or operation(s).

Accordingly, blocks, steps, or operations of the flowcharts support combinations of means for performing the specified functions, combinations of steps for performing the specified functions and program instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and computer instructions.

In this regard, one exemplary embodiment of a method for privacy management as illustrated in FIG. 6 may include accessing one or more privacy options at 600. Each privacy option may be configured to provide members of one or more groups associated with a respective privacy option access to content. Further, associations between the members and the one or more groups may be accessible via an online service.

Additionally, in some exemplary embodiments, the defined privacy options may be accessed. In this regard, the defined privacy options may each include or otherwise be associated with a largest sized group, that is, for each privacy option, at least one of the associated groups is the largest relative to the other groups associated with the same privacy option. Further, according to some exemplary embodiments, no two privacy options may have the same largest sized group.

In some exemplary embodiments of the method of FIG. 6, providing for selection of a privacy option may be included at 610. In this regard, the selection of the privacy option may be associated the content.

Further, FIG. 7 depicts a flowchart describing another exemplary embodiment of the present invention. The method may include accessing one or more privacy options at 700. Each privacy option may be configured to provide members of one or more groups associated with a respective privacy option access to content. Further, associations between the members and the one or more groups may be accessible via an online service.

Additionally, the method may include ordering the privacy options at 710. In this regard, the position of a privacy option within the ordering of privacy options may be indicative of a relative privacy level associated with the privacy option. Additionally, or alternatively, the ordering of a privacy option may be based at least in part on the on a number of members in the one or more groups associated with the privacy option. In some exemplary embodiments, accessing the one or more privacy options at 700 may include accessing one or more ordered privacy options.

Further, in some exemplary embodiments, of the method of FIG. 7, the method may include providing for presentation of representations of the privacy options at 720. The representations of the privacy options may be presented on a privacy line. Further, the arrangement of the representations of the privacy options along the privacy line being based at least in part on the ordering of the privacy options.

In some exemplary embodiments of the method of FIG. 7, providing for selection of a privacy option may be included at 730. In this regard, the selection of the privacy option may be associated with content. Further, in some exemplary embodiments, providing for selection of a privacy option may include providing for selection of a privacy option by allowing for movement of a slider relative to a privacy line to a desired representation of a privacy option. Alternatively, the selection of a privacy option may be provided or discerned from a service used and/or site accessed by a user with the relative privacy then be depicted upon the privacy line to illustrate for the user the relative degree of privacy afforded by the service of the site. By way of example, a user may access the webpage of a bank or other financial institution. If not otherwise known to or predefined by the privacy option generator 230, the bank or other financial institution, either via the webpage or otherwise, may provide the privacy option generator with an indication of the privacy afforded to content that is shared via the website, e.g., a relatively high level of privacy. A privacy line may then be displayed which depicts the service, site and/or the like, such as by name, at the appropriate relative position along the continuum of privacy so as to visually represent to the user the relative privacy that is provided.

Additionally, in some exemplary embodiments, the method of FIG. 7 may also include sharing content at 740. In this regard, content may be shared in response to a member of the one or more groups associated with the selected privacy option requesting the content.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method of controlling access to user content stored in a networked system including a privacy management apparatus, comprising:

associating each of a plurality of privacy options with a different one of a plurality of network access types, the plurality of privacy options defined as specific to a user;

operating the privacy management apparatus to order the plurality of privacy options according to a relative privacy level among the network access types;

presenting, to the user at a user interface of a network device, representations of the plurality of privacy options on a privacy line ordered according to their relative privacy levels;

responsive to a selection input from the user via the user interface, associating a selected one of the privacy options and all privacy options of a higher relative privacy level than the selected privacy option with a content item;

determining, in response to a request for access to the content item from a requesting party, whether the requesting party is a member of a network access type associated with a privacy option associated with that content item; and then, providing for sharing the content item with the requesting party in response to determining that the requesting party is a member of a network access type associated with a privacy option associated with that content item;

wherein the plurality of network access types comprise two or more of a wireless personal area network, a wireless local area network, a local area network, and a mobile network.

2. The method of claim 1, wherein the step of operating the privacy management apparatus orders the plurality of privacy options also according to a criterion indicative of relative privacy selected from the group consisting of: number of members in one or more groups associated with each privacy option; and range of the network access type associated with each privacy option.

3. The method of claim 1, wherein the user interface comprises a slider movable along the privacy line among the representations of the plurality of privacy options on the privacy line.

4. The method of claim 2, wherein the criterion comprises the number of members in the largest sized group associated with each privacy option;

and wherein each of the plurality of privacy options has a largest sized group, with no two privacy options having the same largest sized group.

5. The method of claim 1, further comprising:

responsive to an additional input from the user, associating a selected one of the plurality of privacy options to a sub-item of the content item.

6. An apparatus comprising:

a processor circuit;

a user interface;

a privacy option generator controlled by the processor circuit and configured to:

associate each of a plurality of privacy options with a different one of a plurality of network access types, the plurality of privacy options defined as specific to a user; and order the plurality of privacy options according to a relative privacy level among the network access types; and a privacy option selector controlled by the processor circuit and configured to:

present, to the user at the user interface, representations of the plurality of privacy options on a privacy line ordered according to their relative privacy levels; and responsive to an input from the user via the user interface, associate a selected one of the plurality of privacy options and all privacy options of a higher relative privacy level than the selected privacy option with a content item;

wherein the processor circuit is further configured to:

determine, in response to a request for access to the content item from a requesting party, whether the requesting party is a member of a network access type associated with a privacy option associated with that content item; and provide for sharing the content with the requesting party in response to determining that the requesting party is a member of a network access type associated with a privacy option associated with that content item;

wherein the plurality of network access types comprise two or more of a wireless personal area network, a wireless local area network, a local area network, and a mobile network.

7. The apparatus of claim 6, wherein the privacy option generator orders the plurality of privacy options also according to a criterion indicative of relative privacy selected from the group consisting of: number of members in one or more groups associated with each privacy option; and range of the network access type associated with each privacy option.

8. The apparatus of claim 6, wherein the user interface comprises a slider moveable along the privacy line representations of the plurality of privacy options on the privacy line.

9. The apparatus of claim 7, wherein the criterion comprises the number of members in the largest sized group associated with each privacy option;

and wherein each of the plurality of privacy options has a largest sized group, with no two privacy options having the same largest sized group.

10. The apparatus of claim 6, wherein the privacy option selector is further configured to, responsive to an additional input from the user, associate a selected one of the plurality of privacy options to a sub-item of the content item.

11. A non-transitory computer-readable storage medium having executable computer-readable program code instructions stored therein, the computer-readable program code instructions comprising:

first program code instructions configured to: associate each of a plurality of privacy options with a different one of a plurality of network access types, the plurality of privacy options defined as specific to a user; and order the plurality of privacy options according to a relative privacy level among the network access types;

second program code instructions configured to: present, to the user at a user interface, representations of the plurality of privacy options on a privacy line ordered according to their relative privacy levels; and responsive to an input from the user via the user interface, associate a selected one of the plurality of privacy options and all privacy options of a higher relative privacy level than the selected privacy option with a content item; and third program code instructions configured to:

determine, in response to a request for access to the content item from a requesting party, whether the requesting party is a member of a network access type associated with a privacy option associated with that content item; and provide for sharing the content with the requesting party in response to determining that the requesting party is a member of a network access type associated with a privacy option associated with the selected privacy option;

wherein the plurality of network access types comprise two or more of a wireless personal area network, a wireless local area network, a local area network, and a mobile network.

12. The storage medium of claim 11, wherein the second program code instructions order the plurality of privacy options also according to a criterion indicative of relative privacy selected from the group consisting of: number of members in one or more groups associated with each privacy option; and range of the network access type associated with each privacy option.

13. The storage medium of claim 12, wherein the criterion comprises the number of members in the largest sized group associated with each privacy option;

and wherein the second program code instructions are further configured to receive the input from the user as movement of a slider relative to the privacy line to a desired representation of a privacy option.

14. The storage medium of claim 11, wherein the second program code instructions are further configured to, responsive to an additional input from the user, associate a selected one of the plurality of privacy options to a sub-item of the content item.

* * * * *